Patented Mar. 20, 1934

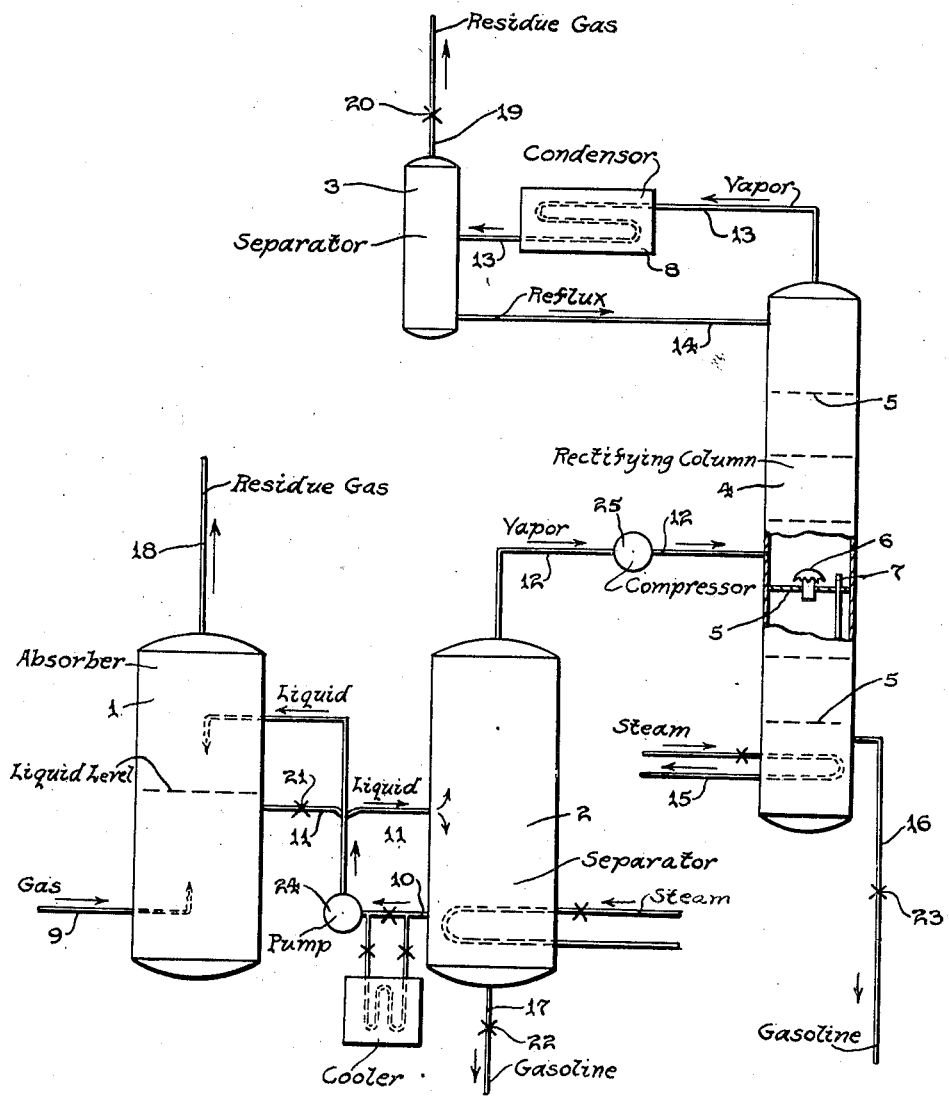

1,951,383

UNITED STATES PATENT OFFICE 1,951,383

PROCESS FOR RECOVERING HYDROCARBON LIQUIDS FROM VOLATILE HYDROCARBON GASES AND VAPORS

Malcolm P. Youker, Bartlesville, Okla., assignor to Phillips Petroleum Company, Bartlesville, Okla., a corporation of Delaware

REISSUED

Application May 13, 1931, Serial No. 537,152

5 Claims. (Cl. 196—11)

My invention relates to the recovery of hydrocarbon liquids from volatile hydrocarbon vapors and gases and has special reference to the recovery of casinghead gasoline from natural gas by a process which was disclosed in an application for patent filed by Malcolm P. Youker in the United States Patent Office April 8, 1926 under United States Patent Office Serial Number 100,583 for a Process for recovering hydrocarbon liquids from volatile hydrocarbon gases and vapors. This application for patent should be taken as a continuation in part of said previous patent application. An object of my invention is to provide an efficient method by which hydrocarbon liquids may be recovered from volatile hydrocarbon vapors and gases. By my invention this advantage is accomplished and likewise other advantages which will be apparent.

My invention will be more fully understood from the following description taken in connection with the accompanying drawing, in which one form of apparatus by which my new process may be carried out is diagrammatically illustrated in side elevation:

Referring to the drawing, the numerals 1, 2 and 3 designate closed vertical cylindrical vessels, 4 is a bubbling type fractionating column in which are disposed bubbling plates 5. Bubbling plates 5 are equipped with bubble caps 6 and overflow tubes 7. A condenser box 8 is filled with cold water. The numbers 9, 10, 11, 12, 13, 14, 15, 16, 17, 18, and 19 indicate pipe lines which are represented by lines. Pipe 9 is in communication with a supply of gas which is to be processed and leads into the lower portion of vessel 1. Pipe 10, in which is mounted a pump 24, leads from the lower portion of vessel 2 into the upper portion of vessel 1. The pump 24 operates to pump from vessel 2 into vessel 1. Pipe 11, in which is mounted a valve 21 leads from the center of vessel 1 into the center of vessel 2. Pipe 12, in which is mounted a gas compressor 25, leads from the top of vessel 2 into the fractionating column 4 between some of bubble plates 5. The compressor 25 operates to pump vapor from vessel 2 into fractionating column 4. Pipe 13 leads from the top of the fractionating column 4 through condenser 8 and into the central portion of vessel 3. Pipe 14 leads from the bottom of vessel 3 into the top of fractionating column 4. Pipe 15 which is in communication with a supply of steam leads through a coil in the bottom of the fractionating column and thence to the atmosphere. Pipes 16 and 17 lead from the bottoms of fractionating column 4 and vessel 2 respectively. Valves 22 and 23 are mounted in pipes 17 and 16 respectively. A pipe 18 leads from the top of vessel 1. Pipe 19, in which is mounted an adjustable loaded valve 20, leads from the top of vessel 3. The loaded valve 20 operates to hold pressure in vessel 3.

This apparatus will be operated to carry out my new process in the following manner:—

The vessel 1 will be maintained partially filled with hydrocarbon liquid which has previously been recovered by the process. Raw gas which contains desirable hydrocarbon liquids will be passed into the vessel 1 through the pipe 9 and will bubble through the liquid which is held in the vessel 1. A pressure equal to or preferably above atmospheric pressure will be maintained in vessel 1. As a result of the contact between liquid and raw gas in the vessel 1, liquid contained in the raw gas will be liquefied in the vessel 1. Residual denuded dry gas will pass from the vessel 1 through the pipe 18. Through manipulation of the valve 21 liquid which will accumulate in vessel 1 will constantly be discharged through pipe 11 into vessel 2 and liquid which will accumulate in the bottom of vessel 2 will by means of pump 24 be constantly discharged through pipe 10 into the upper portion of vessel 1. The compressor 25 will be operated to maintain a pressure preferably below eight pounds per square inch absolute in the vessel 2. The loaded valve 20 will be set to hold a back pressure preferably above one hundred pounds per square inch gauge pressure. Some of the more volatile constituents of the liquid which will flow from vessel 1 through pipe 11 into vessel 2 will as a result of the low pressure maintained in vessel 2 be vaporized in vessel 2 and the vapor thus produced will be forced by the compressor 25 to flow through pipe 12 into the fractionating column 4 and thence upward through the fractionating column 4 and through the pipe 13. Some of the least volatile constituents of the vapor passing through the pipe 13 will be condensed while passing through the condenser 8 and the resultant mixture of gas and liquid will flow into the vessel 3 where a separation of liquid and gas will take place. Residual dry gas will be discharged from vessel 3 through pipe 19 and valve 20. Liquid which will accumulate in vessel 3 will flow thence through pipe 14 into the fractionating column and thence downward through the fractionating column making contact with vapors rising through the fractionating column. Liquid will accumulate in the fractionating column and will be heated by means of passing steam through the pipe 15. Through the operation of valves 23 and 22 liquid products of the process will be withdrawn from the bottom of the rectifying column and the bottom of the vessel 2 through pipes 16 and 17 respectively. The liquid drawn from the rectifying column will be cooled on the way to storage.

The volatility of the liquid drawn from the rectifying column may be decreased by decreasing the back pressure held by loaded valve 20 or by increasing the quantity of steam supplied through pipe 15 and vice versa. The volatility of the liquid drawn from the vessel 2 through pipe 17 may be decreased by decreasing the pressure maintained in the vessel 2 and vice versa.

It should be understood that, while I recommend that a pressure of 100 pounds per square inch, or more, be maintained in the fractionating column 4 and that an absolute pressure of about 8 pounds per square inch be maintained in the separator 2, the process may be operated successfully when other pressures are maintained in these parts of the apparatus. It will be found advantageous to vary both the pressure maintained in separator 2 and the pressure maintained in fractionating column 4 in accordance with variations in the vapor pressure of the gasoline which is to be recovered by the process.

I have found that when operating a high pressure stabilizing fractionating column such as the fractionating column 4, the temperature of cooling water available for condensing purposes being from 60° F. to 90° F., it is advantageous to vary the pressure under which such a fractionating column is operated from about 60 pounds per square inch gauge when making gasoline having a vapor pressure of 10 pounds per square inch absolute to about 200 pounds per square inch gauge when making a gasoline having a vapor pressure of about 30 pounds per square inch absolute. The desirable pressure which should be maintained in the fractionating column 4 would vary with the vapor pressure specification for the gasoline to be produced and with the temperature of cooling water available for condensing purposes. I would recommend that the fractionating column 4 be so constructed as to be capable of standing 250 pounds per square inch pressure and that a back pressure valve 20 be provided which is adjustable to hold any back pressure between 50 pounds per square inch and 250 pounds per square inch. With such equipment and a normal supply of condensing water, gasolines having a vapor pressure varying between 10 pounds per square inch absolute and 35 pounds per square inch absolute could readily be produced at the bottom of the fractionating column 4. The vapor pressure specification for natural gasolines which are commonly in use vary from a minimum of about 12 pounds per square inch absolute to about 35 pounds absolute. It is of course desirable to operate fractionating column 4 under the lowest possible pressure compatible with the manufacture of a given grade of gasoline in order that the power input required for the operation of the compressor 25 may be held at a minimum.

It will also be found advantageous to vary the pressure maintained in the separator 2 with the grade of gasoline manufactured. The maintenance of a maximum pressure in separator 2 will of course result in a minimum power input requirement for the operation of compressor 25 and in order to save power it is then desirable to maintain a maximum pressure in separator 2. However, as the vapor pressure of the liquid retained in separator 2 is increased, the rate of circulation of such liquid through the absorber 1 with respect to the gas passing through absorber 1 must be increased, which results in increasing the power input required by the pump 24. The exact pressure which maintained in separator 2 will result in a minimum combined power requirement by the pump 24 and the compressor 25 is difficult to determine and can only be approached by a careful study in any particular case. The liquid retained in separator 2 will serve as an absorbent for gasoline which is contained in the raw gas so long as the absolute pressure maintained in separator 2 is below the absolute pressure maintained at the point where gasoline is absorbed. The pressure maintained in separator 2 should for economic operation be at least 8 pounds below the vapor pressure of the gasoline which is to be manufactured by the process when taken at the temperature of the raw gas passing through the absorber 1. I would recommend that the separator 2 and the compressor 25 be so constructed that an absolute pressure as low as 2 pounds per square inch may be maintained in the separator 2, then by varying the speed of the compressor 25 the pressure maintained in separator 2 may be varied from 2 pounds absolute when recovering gasoline which has a vapor pressure of 10 pounds absolute to 15 pounds or 20 pounds absolute when recovering gasoline which has a vapor pressure of 35 pounds absolute.

From the above it will be clear that the pressure maintained in the separator 2 may be varied from about 2 pounds per square inch absolute to about 20 pounds per square inch absolute, depending on the nature of the gasoline to be recovered. It will also be clear from the above that the pressure maintained in the fractionating column 4 should be varied from about 50 pounds per square inch gauge pressure to about 250 pounds per square inch gauge pressure, depending upon the character of the gasoline to be recovered.

It is to be noted that desirable constituents of the raw gas are liquefied by means of altering the composition of the raw gas and that this alteration of composition is accomplished by adding to the raw gas some of the previously recovered least volatile constituents of like raw gas. It should also be noted that by my new process a large part of the work which necessarily attends the recovery of casinghead gasoline from natural gas through the use of the conventional, gasoline contaminating, extraneously supplied and comparatively non-volatile absorption oil is eliminated.

Although I have shown one method of carrying out my new process it should be understood that I do not wish to limit myself to the method shown but intend to claim broadly all the new and novel features which are inherent in my new process. For instance, while I have shown how the gasoline absorbed from the gas may be divided into a vaporous fraction and a liquid fraction by means of introducing said absorbed gasoline into a region where the pressure is maintained low enough to cause such a division of said absorbed gasoline to take place, I may elect to separate said absorbed gasoline into said liquid and vaporous fractions by heating said absorbed gasoline and subsequently cool that part of said liquid fraction before using it for an absorbent for more gasoline.

I claim:

1. A process for recovering hydrocarbon liquids from hydrocarbon gases which consists in causing a hydrocarbon gas to make contact with gasoline in a zone maintained at a relatively high pressure, subsequently releasing the liquid which results from said contact into a zone of relatively low pressure to separate said liquid into a vaporous fraction and a liquid fraction, returning at least a portion of said liquid fraction to said first zone for utilization as an absorbent medium in the process, and rectifying said vaporous fraction under superatmospheric pressure to produce therefrom a liquid and a gaseous fraction.

2. A process for recovering hydrocarbon liquids from hydrocarbon gases which consists in causing a hydrocarbon gas to make contact with gasoline in a zone maintained at a relatively high pressure, subsequently releasing the liquid which results from said contact into a zone maintained under absolute pressure below twenty (20) pounds per square inch to separate said liquid into a vaporous fraction and a liquid fraction, returning at least a portion of said liquid fraction to said first zone for utilization as an absorbent medium in the process, and rectifying said vaporous fraction under super-atmospheric pressure to produce therefrom a liquid and a gaseous fraction.

3. A process for recovering hydrocarbon liquids from hydrocarbon gases which consists in causing a hydrocarbon gas to make contact with gasoline in a zone maintained at a relatively high pressure, subsequently releasing the liquid which results from said contact into a zone maintained at a sub-atmospheric pressure about midway between atmospheric and absolute vacuum, to separate said liquid into a vaporous fraction and a liquid fraction, returning at least a portion of said liquid fraction to said first zone for utilization as an absorbent medium in the process, and rectifying said vaporous fraction under super-atmospheric pressure to produce therefrom a liquid and a gaseous fraction.

4. A process for recovering hydrocarbon liquids from hydrocarbon gases which consists in causing a hydrocarbon gas to make contact with gasoline in a zone maintained at a relatively high pressure, subsequently releasing the liquid which results from said contact into a zone maintained at a relatively low pressure to separate said liquid into a vaporous fraction and a liquid fraction, returning at least a portion of said liquid fraction to said first zone for utilization as an absorbent medium, compressing and rectifying said vaporous fraction to produce therefrom a liquid and a gaseous fraction, condensing a portion of said gaseous fraction and refluxing said condensate to the rectification zone.

5. A process for separating from hydrocarbon gas some of the least volatile constituents of said gas which consists in contacting said gas while under comparatively high pressure with an absorption medium comprising gasoline recovered in the process, subsequently releasing the liquid which results from said contact into a region of comparatively low pressure and compressing and rectifying the gases which result from said releasing of pressure on said mixture.

MALCOLM P. YOUKER.